(12) United States Patent
Fischer et al.

(10) Patent No.: US 8,529,866 B2
(45) Date of Patent: Sep. 10, 2013

(54) PROCESS FOR THE PRODUCTION OF HYDROGEN BY STEAM REFORMING AN OIL CUT WITH OPTIMIZED STEAM PRODUCTION

(75) Inventors: Beatrice Fischer, Lyons (FR); Fabrice Giroudiere, Orlienas (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 50 days.

(21) Appl. No.: 13/282,699

(22) Filed: Oct. 27, 2011

(65) Prior Publication Data
US 2012/0107227 A1    May 3, 2012

(30) Foreign Application Priority Data

Oct. 28, 2010    (FR) .................................... 10 04242

(51) Int. Cl.
*C01B 3/24*    (2006.01)
*C01B 3/38*    (2006.01)

(52) U.S. Cl.
USPC ........................................ 423/650; 252/373

(58) Field of Classification Search
USPC ....................................................... 423/650
See application file for complete search history.

(56) References Cited

U.S. PATENT DOCUMENTS

| | | | |
|---|---|---|---|
| 3,958,951 A | 5/1976 | Woebcke et al. | |
| 2006/0057059 A1* | 3/2006 | Nishida et al. | 423/648.1 |
| 2007/0092436 A1 | 4/2007 | Rojey et al. | |
| 2008/0275278 A1* | 11/2008 | Clark | 585/240 |
| 2010/0189638 A1 | 7/2010 | Giroudiere et al. | |

FOREIGN PATENT DOCUMENTS

| | | |
|---|---|---|
| FR | 2 890 955 A1 | 3/2007 |
| FR | 2 914 395 A1 | 10/2008 |

OTHER PUBLICATIONS

Search Report of FR 1004242 (Feb. 28, 2011).
A. Minkkinen et al., "Gas to Hydrogen Power Process—Facilitates CO2 Capture for Sequestration", Proceedings of the 16$^{th}$ World Hydrogen Energy Conference (Jun. 13-16, 2006) pp. 1-9.
F. Giroudiere et al., "HyGensys: A Flexible Process for Hydrogen and Power Production with Reduction of CO2 Emission", Oil & Gas Science and Technology, vol. 65, No. 5 (2010) pp. 673-688.

* cited by examiner

*Primary Examiner* — Melvin C Mayes
*Assistant Examiner* — Kenneth Vaden
(74) *Attorney, Agent, or Firm* — Millen, White, Zelano & Branigan, P.C.

(57) ABSTRACT

The present invention describes a process for the production of hydrogen by steam reforming an oil cut using a hot vector gas, in which the steam produced by the process is used in its entirety in said process, a first portion of the steam being introduced as a mixture with the feed, and the second portion supplying the steam turbine driving the compressor for pressurizing the hot vector gas.

10 Claims, 2 Drawing Sheets

PROCESS FOR THE PRODUCTION OF HYDROGEN BY STEAM REFORMING AN OIL CUT WITH OPTIMIZED STEAM PRODUCTION

FIELD OF THE INVENTION

The present invention concerns the field of processes for the production of hydrogen by steam reforming oil cuts. Synthesis gas, a mixture of carbon monoxide (CO) and hydrogen ($H_2$), is produced by the steam reforming process, starting primarily from natural gas. The steam reforming reaction is a highly endothermic reaction with yields that are increased as the reaction temperature is increased. Using current materials, a temperature of close to 900° C. can be obtained. In the prior art, the catalyst is disposed in a plurality of tubes located in the radiation zone of a special furnace. The flue gases normally exit the radiation zone at a temperature of more than 900° C., which leaves a large quantity of heat to be recovered in the convection zone of the furnace.

In general, the heat available in the flue gases in the convection zone is used to produce steam, a portion of the steam produced being used with the feed for the process. Occasionally, the heat still available in the flue gases is used to pre-heat the combustion air, and also to pre-heat the steam reforming feed.

At the outlet from the catalytic zone, the synthesis gas is at a temperature of approximately 900° C., and has to be cooled very rapidly in order to prevent corrosion of the reactor due to the mixture of CO and hydrogen (a phenomenon known as metal dusting). In general, rapid cooling of the reaction effluents is accomplished by producing supplemental steam. In total, the production of steam linked to the steam reforming process is high, and often in great excess with respect to requirements at the hydrogen utilization site.

Other processes have been proposed, in particular the Hygensys process, which uses flue gases produced by a gas turbine as a heat transfer fluid in a specific exchanger-reactor, those flue gases being re-heated at the outlet from the steam reforming reactor in order to produce electricity with the aid of an expansion turbine. However, a substantial quantity of steam still remains and is exported, albeit in a smaller quantity than in the basic process.

Furthermore, the Hygensys process co-produces electricity, which is not necessarily useful on site and thus requires a transmission system with a transformer for exportation.

The process of the invention can be used to optimize the production of steam insofar as the steam produced is used in its entirety to satisfy the internal requirements of the process, i.e. essentially the steam necessary for mixing with the hydrocarbon feed, and that necessary for the process equipment.

The process of the invention does not co-produce electricity; thus, the only products of the process are hydrogen and discharged $CO_2$. From this viewpoint, the performance of the process of the present invention is better than in prior art processes. The process of the invention is also more compact, and thus less costly, in particular as regards simplification of the exchangers for the flue gases leaving the reactor (25).

Finally, the process of the invention means that fuel combustion is lower, and thus the quantity of $CO_2$ discharged, expressed in kg of discharged $CO_2$ per kg of hydrogen produced, is lower than in any of the prior art synthesis gas production processes.

Examination of the Prior Art

The prior art regarding processes for steam reforming oil cuts or natural gas to produce synthesis gas is vast. We shall limit it to the process which constitutes the prior art closest to the present invention which is known by the commercial name Hygensys; a description can be found in patent FR 2 890 955.

The Hygensys process falls into the category of processes for the production of synthesis gas by steam reforming a hydrocarbon cut or natural gas and is characterized by adding heat by means of a hot gas generated outside the exchanger-reactor within which the steam reforming reactions are carried out. The exchanger-reactor itself may be based on the original design described in patent FR 2 914 395.

The Hygensys process described in the cited documents co-produces superfluous steam, along with electricity.

The present process differs from the prior art in the absence of the co-production of steam and electricity. In addition, its $CO_2$ discharge per unit of hydrogen produced is lower than that of the prior art, and means that approximately 0.5 kg of $CO_2$ less per kg of hydrogen produced is discharged.

BRIEF DESCRIPTION OF THE INVENTION

Figure 1:
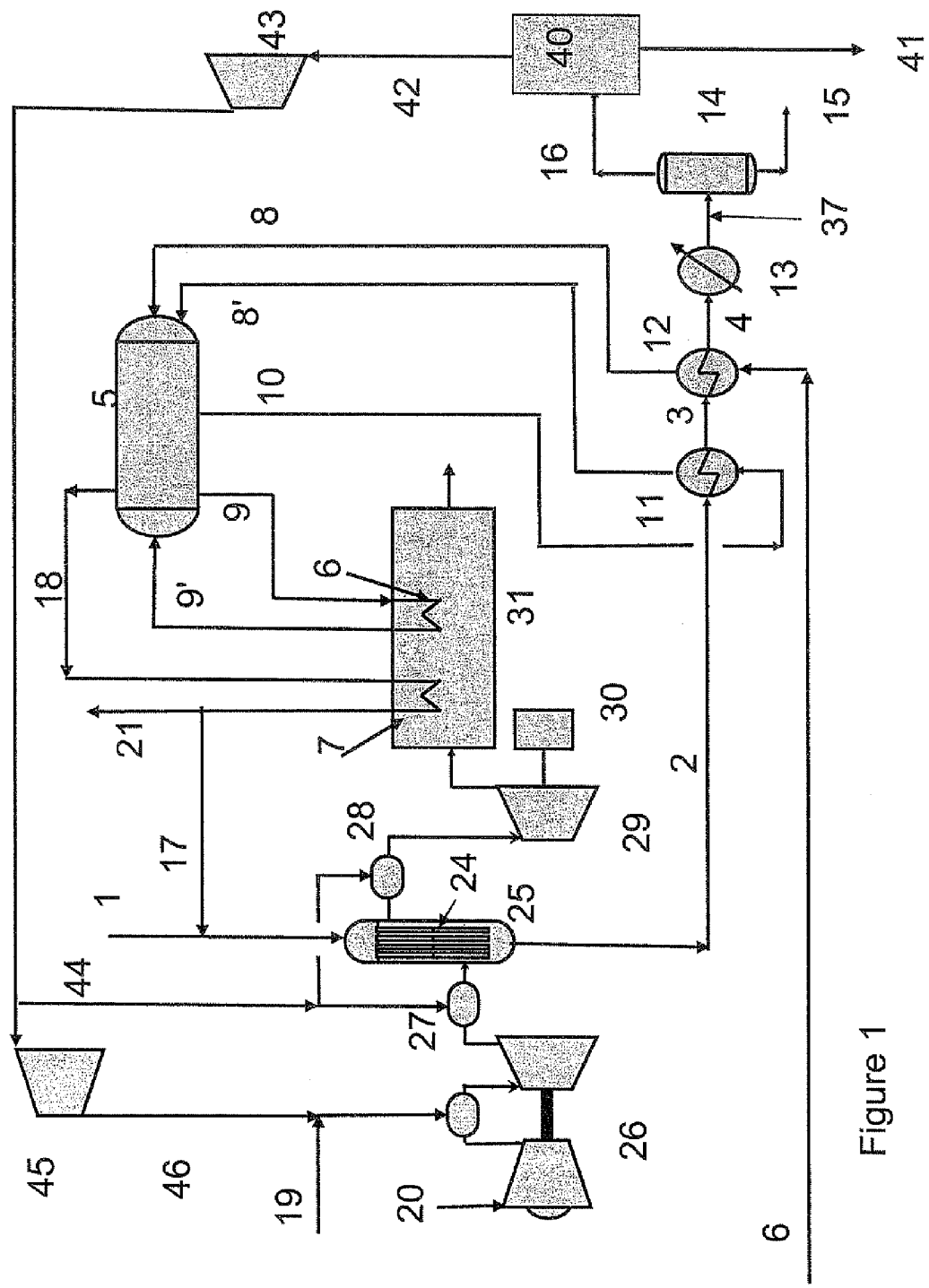
FIG. 1 shows a flow chart of the Hygensys process in accordance with patent FR 2 890 955.

The present invention can be defined as a process for the production of pure hydrogen, i.e. with a degree of purity of at least 99.5% (by weight), by steam reforming a hydrocarbon cut in an exchanger-reactor using hot flue gases under pressure generated by a combustion chamber as the heat transfer fluid. Compared with any of the prior art processes, the process of the present invention generates a quantity of steam which corresponds exactly to the requirements of the process, i.e. on the one hand to the steam necessary for steam reforming the hydrocarbon feed and on the other hand to the supply of energy for the steam turbine which can drive the compressor to pressurize the heat transfer fluid.

The term "exactly" means a quantity of steam equal to the requirements defined above plus or minus 10%, knowing that a device for controlling and regulating the pressure of the flue gases employing a valve placed downstream of the exchangers on the line for evacuating said flue gases after their passage through the steam reforming reactor can absorb the permitted plus or minus 10% of variations about the nominal operational level of the process.

More precisely, the process for the production of hydrogen by steam reforming an oil cut in accordance with the present invention employs a combustion chamber (27) producing hot flue gases (34) starting from a stream of air (20) and fuel gas (19).

Said hot flue gases (34) are pressurized by the compressor (32) and supply their heat to the exchanger-reactor (25) within which the reactions for steam reforming the hydrocarbon feed (1) mixed with steam (17) are carried out.

The hydrocarbon feed (1) may be constituted by any type of oil cut, including natural gas, and will preferably be a cut containing in the range 1 to 10 carbon atoms, preferably in the range 1 to 5.

The reaction effluent (2) essentially constituted by a mixture of hydrogen and carbon monoxide (known by the skilled person as "synthesis gas") is cooled in a series of exchangers denoted (11), (12), (13) and the flue gases (35) at the outlet from the reactor (25) are cooled in another series of exchangers (6-1) (7-1), to generate steam introduced into the drum (5) via the streams (8), (8') and (9').

Figure 2:
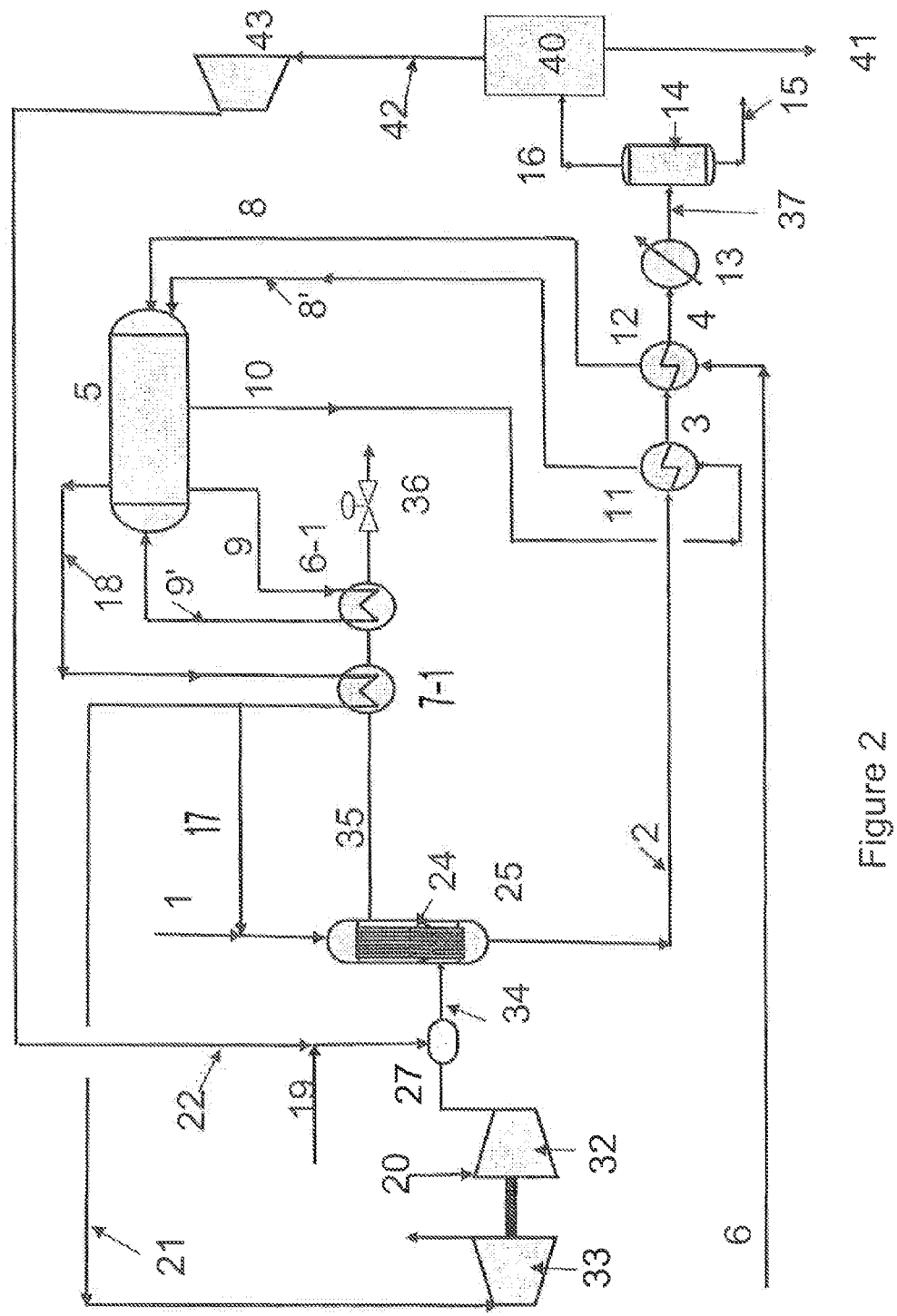
FIG. 2 shows a flow chart of the process of the present invention.

The number of exchangers that can cool the reaction effluent (2) such as (11), (12), (13), the number of exchangers that can cool the flue gases (35) such as (6-1), (7-1) and the number of lines such as (8), (8'), (9) leading to the drum (5) are not limiting and are given in this case in relation to FIG. 2 in order to provide a better understanding of the description.

A first portion (17) of said steam is used as a mixture with the feed to be treated (1), and a second portion (21) is used to supply the turbine (33) which supplies the energy necessary for the compressor (32).

The process for the production of hydrogen by steam reforming an oil cut in accordance with the present invention thus produces a quantity of steam (18) which is used in its entirety in the process per se by proceeding as follows:
   the flow of steam from the process (17) is sent as a mixture with the hydrocarbon feed (1) to the steam reforming reactor (25), controlling its flow to adjust the ratio of the steam (17) to the hydrocarbon feed (1) to a value in the range 1.5 to 3, preferably in the range 1.5 to 2;
   the remaining steam which is produced (21) is used to supply the steam turbine (33) associated with the compressor (32), the flow of air (20) supplying said compressor (32) being controlled by means of the valve (36) placed on the flue gases circuit (35) downstream of the exchangers (7-1) and (6-1) such that the operating pressure of the compressor (32) is adjusted to between 3 and 5 bars absolute in order to remain on the characteristic curve of said compressor.

In a variation of the process of the present invention, after separating out the water in the separator (14), the effluent gas (2) (known as "synthesis gas") obtained (37) after cooling in the series of exchangers (11), (12), (13) is introduced via the line (16) into the sieve separation unit (40) which on the one hand produces process hydrogen (41) in a purity of more than 99.9% and on the other hand produces a purge gas (42) which is compressed by the compressor (43) to constitute the combustion gas (22) supplying the combustion chamber (27), optionally as a mixture with a makeup fuel gas (19).

The process of the present invention for the production of hydrogen by steam reforming produces a discharged quantity of $CO_2$ which is less than 9.5 kg per m$^3$ of hydrogen produced, which represents a smaller ratio than that for any of the prior art steam reforming processes.

The oil cut used as the feed for the process may be any hydrocarbon cut containing in the range 1 to 10 carbon atoms, preferably in the range 1 to 5. In particular, the feed to be treated may be natural gas.

DETAILED DESCRIPTION OF THE INVENTION

A proper understanding of the process of the invention requires the flow chart of FIG. 1 to be described. This flow chart represents the Hygensys process which constitutes the closest prior art; the present invention can be viewed as an adaptation to situations where the site does not need steam (except for that required by the steam reforming process itself), nor does it require electricity.

The feed, preferably natural gas, is sent to the exchanger-reactor (25) via the line (1), as a mixture with steam arriving via the line (17). The catalyst is disposed in bayonet tubes (24) of the exchanger-reactor (25) heated by pressurized flue gases originating from a hot gas generator (26), and re-heated in a combustion chamber (27) by combustion of a fuel gas (44). At the outlet from the exchanger-reactor (25), the flue gases are re-heated in the combustion chamber (28) before entering the expansion turbine (29) driving the alternator (30).

The flue gases, which are still hot at the turbine outlet (29), enter a heat recovery section (31). Heat is recovered, producing steam in the zone (6) and superheating it in the zone (7) of the recovery section (31).

The effluent from the exchanger-reactor (25), termed synthesis gas (2), leaves the reactor (25) at approximately 600° C. It is sent to the exchanger (11) to be cooled by indirect heat exchange with boiler water arriving via the line (10) and returning to the steam drum (5) via the line (8) in the partially vaporized form.

The reaction effluent (3) leaving the exchanger (11) is then sent to the heat exchanger (12) for indirect heat exchange with boiler water (6) which is pre-heated and sent to the steam drum (5).

The reaction effluent (4) constituting the synthesis gas is then cooled in the heat exchanger (13) by indirect heat exchange with cooling water (or possibly with air) before being supplied to the drum (14) in which residual water (15) is separated from the mixture ($H_2$, CO and $CO_2$) which is recovered via the line (16).

The stream from the line (16) is directed towards a sieve separation section (40) which will separate pure hydrogen (41) from the purge (42) and will then be compressed by the compressor (43).

A portion (44) of said purge (42) is burned in the combustion chambers (27) and (28), the remainder being compressed in the compressor (45) before being sent via the line (46) to the hot gas generator (26) for burning as a mixture with the fuel gas (19).

The quantity of steam produced is definitely reduced with respect to a prior art steam reforming process, but a large quantity of electricity is produced in the alternator (30), which is not necessarily desired at the same time as the production of hydrogen.

The description of the flow chart for the process of the present invention is made with the help of FIG. 2. The elements of the flow chart of the present invention and the flow chart of the Hygensys process which have the same function have the same numerals in FIGS. 1 and 2.

This clearly shows that the flow chart of the invention is simplified compared with the Hygensys flow chart, since the elements (29), (30) and (45) have disappeared and the complex exchangers (7) and (6) have been replaced by the simple exchangers (7-1) and (6-1). The term "simple exchangers" means shell and tube exchangers such as those corresponding to the TEMA or CODAP manufacturing standard. This point is of importance as regards economics, since special exchangers can easily be twice or even three times the price of simple exchangers.

More precisely, the flow chart for the invention can be described as follows:

The feed, preferably natural gas, is sent to the exchanger-reactor (25) via the line (1) as a mixture with steam arriving via the line (17).

The catalyst is disposed in bayonet tubes (24) heated by pressurized flue gases (34) originating from a compressor (32) associated with a turbine (33), and re-heated in a combustion chamber (27) by combustion of a fuel gas principally constituted by purge (22) and a makeup gas (19), along with a stream of air (20).

At the outlet from the reactor (25), the flue gases (35), which are still under pressure, enter two exchangers in series (7-1) and (6-1) which are simple standard type exchangers.

The heat from the flue gases (35) is recovered by producing steam in the exchanger (6-1) and by superheating it in the exchanger (7-1).

The reaction effluent (2) from the steam reforming reactor (25) (termed synthesis gas) leaves the reactor (25) at approximately 600° C. It is sent to the first exchanger (11) and is cooled by indirect heat exchange with boiler water arriving via the line (10) and returning in the partially vaporized form to the steam drum (5) via the line (8').

The partially cooled reaction effluent (3) is then cooled in the heat exchanger (12) by indirect heat exchange with boiler water (6) which is pre-heated and sent to the steam drum (5) as the stream (8).

The reaction effluent (4) from cooling in the exchanger (12) is then cooled in the heat exchanger (13) by indirect heat exchange with cooling water (or possibly air if the temperature allows it) before being supplied to the separator drum (14).

In said separator drum (14), residual water (15) is separated out and the $H_2$, CO and $CO_2$ mixture (constituting the synthesis gas) leaving said drum (14) via the line (16) is sent to a sieve separation section (40) which will separate pure hydrogen (41) from the purge (42) and which is then compressed by the compressor (43) to constitute the combustion gas (22) supplying the combustion chamber (27), optionally as a mixture with a makeup fuel gas (19).

A first portion of the steam produced by the exchangers (6-1), (11) and (12) and superheated in the exchanger (7-1) is sent via the line (17) to the steam reforming reactor (25) and the second portion (21) supplies the steam turbine (33) which drives the compressor (32).

The pressure at the compressor outlet (32) is adjusted such that there is no excess steam.

The exchangers (6-1) and (7-1) are simple pressurized exchangers (of the standard tube/shell type).

Comparative Example

Consider the production of 100000 $Nm^3$/h of hydrogen in a purity of 99.9% by weight.

In the prior art Hygensys process, 32.1 tonne/h of natural gas is required and this co-produces 18 tonne/h of steam and 28 MW of electricity (MW=megaWatt, i.e. $10^6$ watts).

In accordance with the process of the present invention, only 29.7 tonne/h of natural gas is required, and there is no excess steam production (nor any electrical energy production).

Moreover, the cost of the unit is reduced compared with the prior art, as there is no need for an expansion turbine (29).

Since the consumption of natural gas is lower, the $CO_2$ emitted is also reduced to 84 tonne/h (i.e. 9.1 kg $CO_2$/kg of hydrogen) instead of 87.9 in the Hygensys process (i.e. 9.5 kg $CO_2$/kg of hydrogen).

A material balance for the process of the invention is provided below for the principal streams:

Feed (1): 29.4 tonne/h;
Steam in process (17): 64.6 tonne/h;
Steam (21) necessary to drive turbine (33): 56.9 tonne/h
Hot flue gases (34): 411.3 tonne/h;
$H_2$ produced (41): 9.2 tonne/h;
Combustion gas (22): 64.7 tonne/h;
Condensates (15): 20.2 tonne/h;
Fuel gas makeup (19): 0.36 tonne/h.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding French application Ser. No. 10/04.242, filed Oct. 28, 2010, are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for the production of hydrogen by steam reforming a hydrocarbon feed, said process comprising:
    producing hot flue gases in a combustion chamber from a stream of air and fuel gas,
    pressurizing said hot flue gases in a compressor and supplying the heat of said hot flue gases to an exchanger-reactor,
    performing steam reforming of a hydrocarbon feed mixed with steam in said exchanger-reactor,
    cooling effluent synthesis gas from said exchanger-reactor in a first series of exchangers and cooling flue gases from said exchanger-reactor in another series of exchangers to generate steam which is introduced into a drum,
    wherein steam produced by said process is used in its entirety in said process by the following procedure:
        the flow of steam from said process is sent as a mixture with the hydrocarbon feed to said exchanger-reactor, wherein the flow of said steam is adjusted so that the ratio of the steam to the hydrocarbon feed is in the range 1.5 to 3; and
        the remaining steam produced by said process is used to supply a steam turbine associated with said compressor, the flow of air supplying said compressor (32) being controlled by means of a valve (36) placed on a line carrying said flue gases downstream of said another series of exchangers such that the operating pressure of said compressor is adjusted to between 3 and 5 bars absolute.

2. The process according to claim 1, further comprising separating out water from said effluent synthesis gas in a separator, then cooling said effluent synthesis gas in said first series of exchangers and introducing the resultant cooled effluent synthesis gas into a sieve separation unit which produces process hydrogen in a purity of more than 99.9% by weight and produces a purge gas which is compressed by a compressor and supplied to said combustion chamber as said at least a part of said supply of air, optionally as a mixture with makeup fuel gas.

3. The process according to claim 2, wherein the hydrocarbon feed for the steam reforming reactor is an oil cut containing in the range 1 to 10 carbon atoms.

4. The process according to claim 2, wherein the flow of said steam is adjusted so that the ratio of the steam to the hydrocarbon feed is in the range 1.5 to 2.

5. The process according to claim 1, wherein the hydrocarbon feed for the steam reforming reactor is an oil cut containing in the range 1 to 10 carbon atoms.

6. The process according to claim 1, wherein the flow of said steam is adjusted so that the ratio of the steam to the hydrocarbon feed is in the range 1.5 to 2.

7. The process according to claim 1, wherein the hydrocarbon feed for the steam reforming reactor is an oil cut containing in the range 1 to 5 carbon atoms.

8. The process according to claim 1, wherein the hydrocarbon feed for the steam reforming reactor is natural gas.

9. The process according to claim 1, wherein the exchangers of said another series of exchangers for cooling flue gases from said exchanger-reactor are shell and tube exchangers.

10. The process according to claim 1, wherein said exchanger-reactor contains catalyst disposed in bayonet tubes that are heated by said hot flue gases from said combustion chamber.

* * * * *